No. 716,976. Patented Dec. 30, 1902.
A. ALFSON.
RIFLE.
(Application filed Mar. 14, 1902.)
(No Model.) 3 Sheets—Sheet 2.
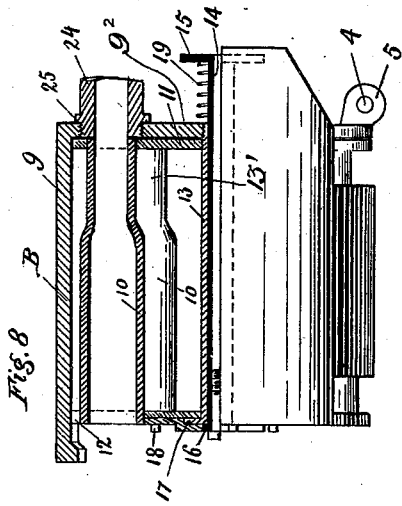
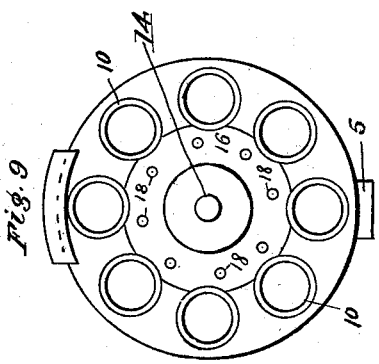
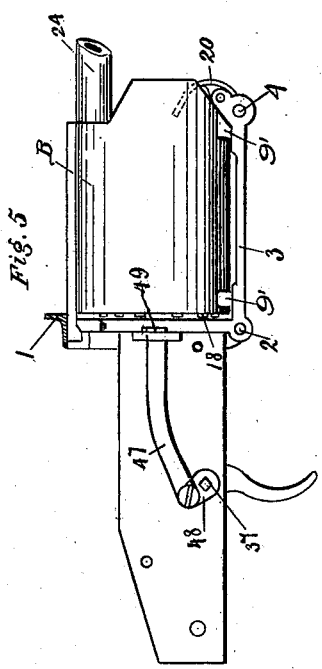
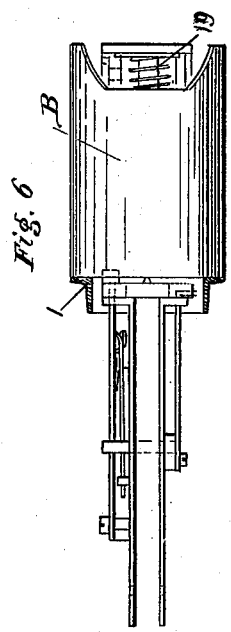
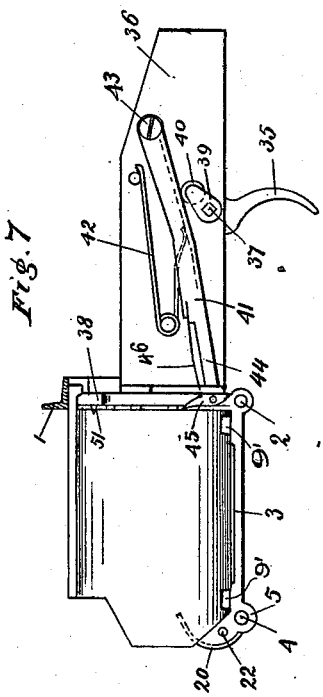
WITNESSES:
Paul Gerlandt
Frank Britsch
INVENTOR
Andrew Alfson
BY Robt. Klotz
ATTORNEY No. 716,976. Patented Dec. 30, 1902.
A. ALFSON.
RIFLE.
(Application filed Mar. 14, 1902.)
(No Model.) 3 Sheets—Sheet 3.
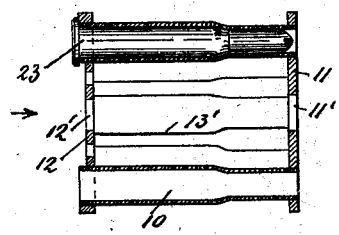
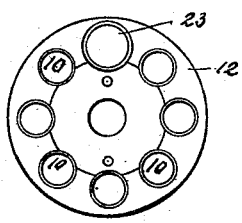
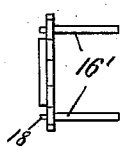
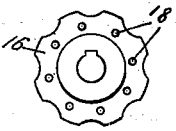
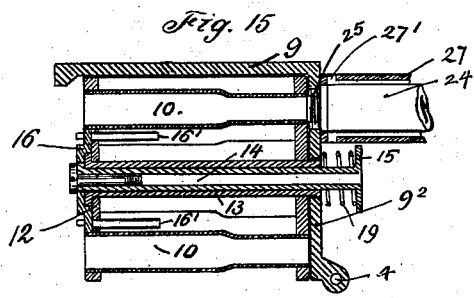
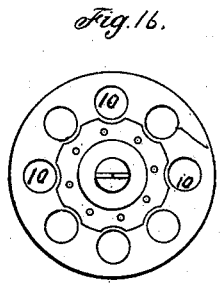
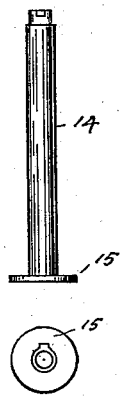
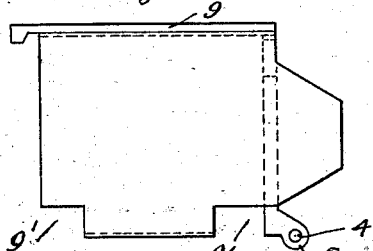
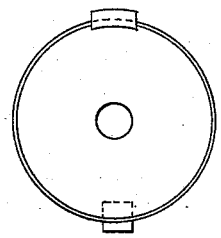
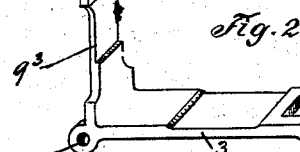
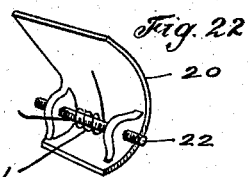
WITNESSES
Paul Gerhardt
Frank Britsch
INVENTOR
Andrew Alfson
BY Robt. Kloth
ATTORNEY

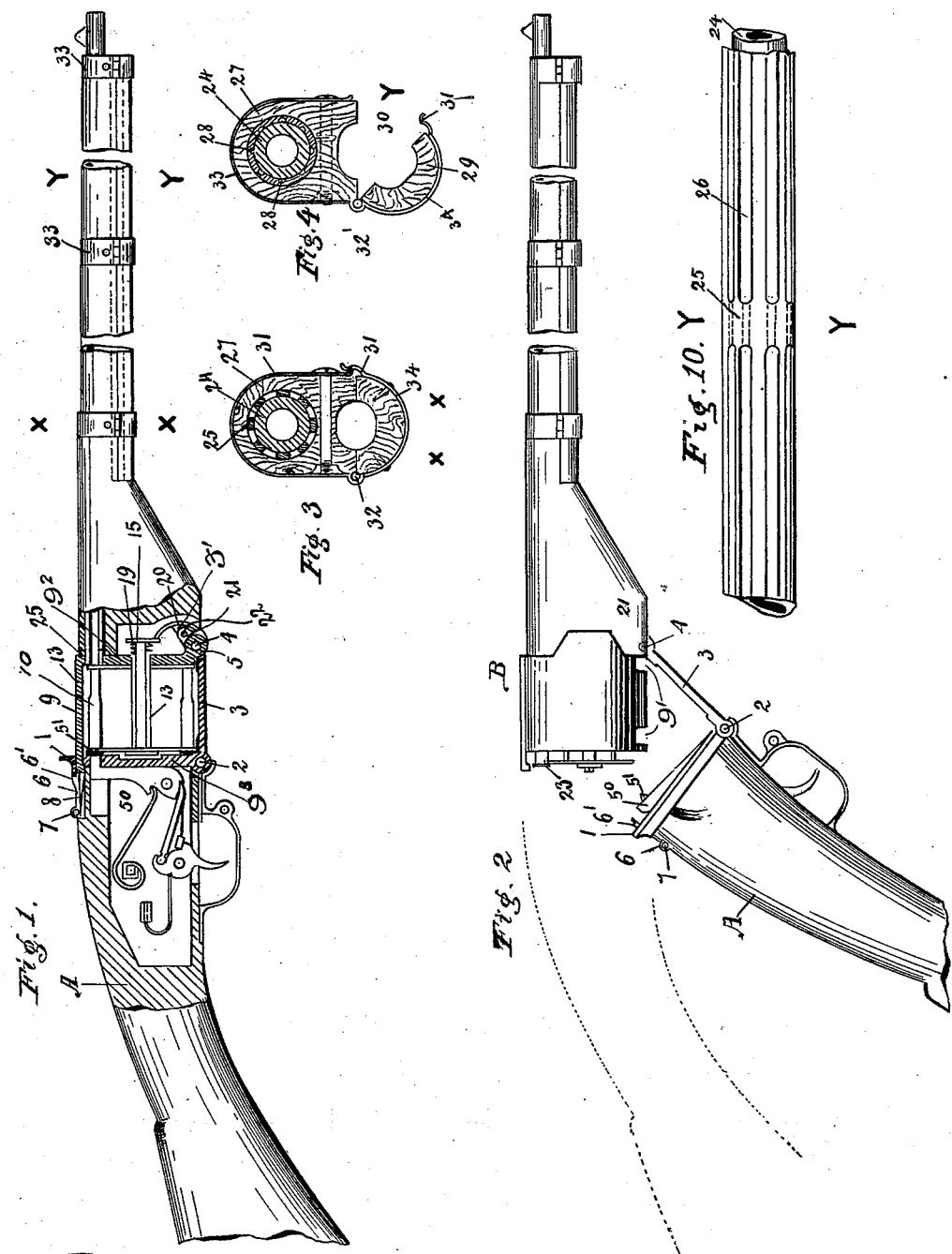

UNITED STATES PATENT OFFICE.

ANDREW ALFSON, OF CHICAGO, ILLINOIS.

RIFLE.

SPECIFICATION forming part of Letters Patent No. 716,976, dated December 30, 1902.

Application filed March 14, 1902. Serial No. 98,225. (No model.)

*To all whom it may concern:*

Be it known that I, ANDREW ALFSON, residing at Chicago, Cook county, Illinois, have invented certain new and useful Improvements in Rifles, of which the following is a specification.

My invention relates to improvements in firearms, and particularly to quick - firing rifles especially adapted for military and general field use.

The objects of my invention are to provide a gun that shall be simple in construction and have few parts, while positive and reliable in its action; and the particular object is to provide means for keeping the magazine, as well as the loading and firing mechanism, at a very low temperature during rapid successive discharges, it being my main object to prevent the rifle from getting heated while the rifle is subjected to a long and continuous use. I attain these objects by the mechanism illustrated in the accompanying drawings, in which—

Figure 1 is a side elevation, partly in section, of a rifle embodying my invention, showing the firing mechanism and magazine. Fig. 2 is another side elevation showing the breech open. Fig. 3 is a cross-section on the line $x\ x$ of Fig. 1. Fig. 4 is a cross-section on the line $y\ y$ of Fig. 1. Fig. 5 is a side elevation of the receiver with the front and rear stocks detached. Fig. 6 is a plan view of Fig. 5. Fig. 7 is a view taken from the opposite side of Fig. 5. Fig. 8 is a side view, partly in elevation and partly in section, of the casing and cylinder or magazine. Fig. 9 is a rear end view of the magazine. Fig. 10 is a portion of the barrel, showing the slotted ventilating-tube thereon. Fig. 11 is a sectional side elevation of the cylinder or magazine, showing the plates 11 and 12 thereof in their relation to the cartridge-chambers and also showing one chamber loaded. Fig. 12 is an end view of Fig. 11 viewed in the direction of the arrow. Figs. 13 and 14 are side and end elevations of the extractor-plate, showing the keys 16' and pins 18 thereon. Fig. 15 is another sectional side elevation of the cylinder or magazine, showing a portion of the outer casing within which said cylinder is mounted upon the hollow spindle or tube 13, also showing the spindle 14 within said tube, the extractor-plate fixed on said spindle 14, the disk or collar 15, and a fragment of the barrel inserted in the casing. Fig. 16 is another end view of the cylinder similar to Fig. 12, but with the extractor-plate added thereto. Fig. 17 is the revoluble spindle rigidly secured to the extractor-plate. Fig. 18 is a side elevation of the outer casing or shell within which the cylinder is mounted, showing the ventilating-openings in the lower part thereof. Fig. 19 is an end view of Fig. 18. Fig. 20 is the tube rigidly secured within the outer casing and constituting the axis upon which the magazine rotates. Fig. 21 is the extension-piece or elbow rigidly secured to the butt-end of the rifle and which constitutes the connecting hinge between the butt and barrel ends of the rifle. Fig. 22 is an enlarged view of the curved piece through which the extractor-plate is forced outward when the gun is broken.

Similar letters and figures refer to similar parts through the several views.

In the drawings the stock part A of the rifle is connected with the receiver B or the barrel end of the rifle by means of the extension-piece or hinge 3; the part $9^3$ (having hammer-point opening $9^4$) of which is rigidly secured to the stock part A of the rifle by any suitable means. The gun is closed and the parts A and B locked together by means of the sleeve 1, pivoted at 2 to the lower extension-piece 3. The latter is provided with the short levers 3' and has the form of a square angle, as shown in Fig. 22. The extension-piece 3 is pivoted at 4 to the lugs 5 of the receiver B. The hinged sleeve 1 is again secured to the stock part A by a small catch or lever 6, pivoted at 7 and kept in position by the small spring 8. When the stock part A and receiver B are connected to each other and in their normal position, as shown in Fig. 1, the two parts can be disconnected by pressing upon the catch or lever 6 and turning back the sleeve 1 on its pivot 2, thereby allowing the sleeve 1 to press over the part 6' of the lever 6, the whole of the butt-end A then being permitted to drop down on its hinge at 4.

The receiver B consists of an outer casing or shell 9, open at one end and closed at the other, save a circular opening which registers with the barrel-bore, and is provided with the permanent ventilator-openings 9', communicating with the open air. Revolubly mounted within said outer casing 9 upon the hollow spindle 13, rigidly secured to the closed end $9^2$ of said casing, is a magazine consisting of the cartridge-chambers 10, the respective ends of which are rigidly secured by soldering or other suitable means to the plates 11 and 12, provided with central circular openings 11' 12', respectively, through which the hollow spindle 13 passes. One end of said hollow spindle 13 is screw-threaded into the closed end or wall $9^2$ of the outer casing 9. Loosely mounted within the hollow spindle 13 is the extractor-plate spindle or rod 14, which is provided at one end with the extractor-plate 16 and at the other end with the collar or disk 15, both rigidly secured thereto. The extractor-plate 16 is provided with outwardly-extending pins 18, rigidly secured thereto, circularly arranged thereon at equal distances apart, one pin being provided for each chamber of the magazine. As will hereinafter be explained, the extractor-plate 16, and therewith the magazine, is rotated by means of said pins 18. To prevent rotary movement of the extractor-plate 16 with relation to the magazine, pins 16' are provided, said pins being rigidly secured to the extractor-plate and suitable holes or openings 16" being provided for the free longitudinal movement of said pins in the plate 12. Between the collar or disk 15 of the extractor-plate spindle and the closed end $9^2$ of casing 9 and around said spindle is a spiral spring 19, which normally presses or holds the extractor-plate 16 against the plate 12 or returns said extractor-plate and spindle 14, with its other collar or disk 15, in the direction of the rifle-barrel after the empty shells have been expelled and the gun closed. The extractor-plate 16 is forced outward to expel the empty shells by means of the curved piece 20, Fig. 23, pivoted to the short levers 3' on the pin 22, the ends of which are mounted in the holes 22'. The curved piece 20 is kept in tension by the spiral spring 21, wound around the pivot-pin 22, as shown in Fig. 23, the respective ends of said spiral spring bearing, respectively, against the upper surface of the extension-piece 3 and the inner surface of the curved piece 20.

The stock part A and the receiver B having been disconnected by turning back the sleeve 1 and the former lowered on its hinge or extension-piece 3, the collar or disk 15 is, by means of the piece 20, which describes a turning movement with said extension-piece 3, pushed in the direction of the butt-end of the rifle, compressing the spring 19 and moves out the extractor-plate 16, which in turn catches with its outer rim the flanges of the cartridge-shells and ejects them.

With the magazine, consisting of the individual cartridge-chambers 10 and disks 11 and 12, inclosed by the casing 9, provided with the openings 9', it will be seen that a free passage of air is allowed all through the magazine and around each individual cartridge-chamber, and the hot air produced by each discharge is allowed to promptly escape through the openings 9' and fresh air take its place.

The end of the rifle-barrel 24 is threaded and screwed into the hole 25 of the casing-wall $9^2$, this being in a position corresponding to the upper chamber of the magazine, Figs. 1 and 15. Around the barrel 24 is a slotted tubing 25, the slots 26 thereof running the whole length of the barrel with the exception of a short band at its middle portion to keep the tube integral. To provide communications between the slots 26 on each side of the said middle band, or, in other words, to afford a continuous air-circulation from one end of the barrel to the other through said slots, the middle band of said tube is provided with corrugations or flutings 28, Fig. 4, in line with the respective slots, as shown in dotted lines, Fig. 10, so as to form a trough, channel, or arch passage-way for the air past the said middle portion of the slotted tube.

Around the tube 25 is a sleeve or covering 27, of wood or other suitable material, inclosing the barrel and tubing. At the receiver B end of said sleeve or covering 27, where it forms a junction with the wall $9^2$ of said receiver B, I provide small holes 27', which register with the slots 26, and said holes 27' constitute the air outlets or inlets for that end of the barrel. Thus the air circulates through the entire length of the barrel through the holes 27', the slots 26, the flutings 28 in the middle band of the tubing 25, and the open ends of said slots at the muzzle end of the barrel.

Below the barrel 24 is a receptacle for carrying the cleaning-rod more conveniently than heretofore. It consists of a lower piece of suitable material 29, hollowed out in the center at 30 and hinged and secured to the upper barrel-casing 27 by means of a catch 31 and pivot-pin 32. Clamps or straps 33 and 34 pass around the casing 27 at convenient intervals.

The mechanism for firing off my rifle consists of a trigger 35, pivoted at 37 in a pair of plates 36, running parallel to each other and rigidly secured to the front or butt pieces 38. Attached to and also pivoted at 37 is a small lever 39, having a small roller 40 attached to its end, said roller 40 running along and forcing upwardly the lever 41, same being kept in its relative position by the aid of the spring 42 and pivoted at 43. At the other end 44 of lever 41 is pivoted a dog 45, which is kept in a forward position by a small spring 46, Fig. 7. The trigger being moved backward with the operator's finger, the dog 45 is forced in an upward direction in contact with the small pins 18 of the collar 16, rigidly secured to rod 15 and having the key or feather connection 16' with disk 12 of the magazine, revolving said magazine. Simultaneously with this movement there takes place through the lever 47 on the opposite side of plates 16, (see Fig. 5,) the lever 48 pivoted also at 37, a forward movement of the point 49 of lever 47, this point placing itself directly under another pin 18 of the plate 12 in such a manner that it prevents the turning of the circular magazine more than one notch or until the trigger has made its full movement and the hammer 50 (see Fig. 1) has been released for its forward movement and its point 51 has been struck into the end of the cartridge, exploding same and firing the bullet incased therein.

The operation of loading, firing, and ejecting is as follows: The person using the rifle has cases or plates with the cartridges inserted therein in exactly the same relative position as the magazine-tubes of the magazine, so as to facilitate the filling of all the magazine-chambers at the same time and with one movement. Pressing down the catch 6 and turning back the sleeve 1 brings the butt-end down far enough to permit the cartridges to be inserted into the chambers. This done, the butt-end is again brought up on line with the magazine, the sleeve 1 moved forward, and the gun is ready for firing.

My drawings show eight chambers; but the chambers may be provided in any convenient number. The magazine having been discharged, the operator pushes down the catch 6 again, throws back the sleeve 1, and as soon as the butt-end drops the collar 15 will be struck by the point 20, forcing the extractor-plate 16 in the direction of the operator, said extractor-plate engaging the rims of the cartridge-shells and ejecting them. Any hot air that has been created during the firing has had a free escape through the open receiver or casing 9 and the air-spaces 26 around the barrel communicating therewith. As will be readily understood, this will keep the rifle in a much longer serviceable condition under all circumstances. The ventilating-openings in the casing 9 may be of any suitable form, and it will also be seen that the minor details of my construction can be altered in many ways without departing from the spirit of my invention, and I therefore do not confine myself to the specific construction herein shown and described.

Having thus described my invention, I claim as new and desire to secure by Letters Patent—

1. The combination in a rifle of an outer casing having suitable openings therein communicating directly with the atmosphere, a magazine revolubly secured within said casing and consisting of a pair of perforated disks having cartridge-chambers rigidly secured to and therebetween, said magazine being revoluble on a spindle or axis having its one end rigidly secured to a fixed partition within said casing, said partition having a cartridge-opening registering with or in front of the barrel-bore of said rifle, suitable means for revolving said disks and cartridge-chambers and for discharging cartridges therein substantially as described.

2. The combination, in a rifle, of an outer casing or cylinder provided with open air-ventilators, a magazine revoluble within said casing and consisting of individual cartridge cells or chambers circularly arranged between and securely attached to a pair of disks provided with perforations registering with the open ends of said cells or chambers, said magazine being revoluble on a tube or spindle rigidly secured to an end or partition in said cylinder or casing, said magazine and each of its individual cartridge cells or chambers having a constant and direct air-circulation through the said open ventilators, and suitable means for revolving said magazine discharging and ejecting cartridges therein and therefrom, substantially as described.

3. The combination, in a rifle, of a magazine consisting of cartridge-chambers circularly arranged between and attached to two disks, said disks having suitable openings communicating with the interior of said cartridge-chambers, an open outer casing or cylinder inclosing said magazine and having a pivotal or revoluble connection with relation thereto, said cartridge-chambers being set apart from each other and having air-spaces around and therebetween, said air-spaces being always in direct communication with the openings in said open casing and having free outer-air circulation therethrough, suitable means for revolving said magazine, suitable means for discharging cartridges therein, and suitable means for ejecting empty cartridge-shells therefrom, substantially as described.

4. In a rifle, the combination of a receiver consisting of an outer casing having suitable permanent ventilating-openings, a magazine therein consisting of individual cartridge chambers or cells, supported only at their ends by suitable disks, each and all of said cells being surrounded by air-spaces between said disks, said disks and associated chambers being revolubly secured within said casing, a rifle-barrel provided with a sleeve having a series of straight, longitudinal slots or air-spaces therein, said barrel air-spaces communicating with the interior of said open casing and said sleeve being incased in a coat of suitable material and suitable means for connecting said barrel and casing, substantially as described.

5. In a rifle, the combination of a receiver, consisting of an outer casing having permanent openings in direct communication with outer-air circulation, a magazine revolubly secured therein and consisting of a series of cartridge-form chambers securely attached to and circularly arranged between two suitable perforated disks, said chambers being set apart from each other and having air-spaces therebetween in direct circulation with the open atmosphere, a rifle-barrel secured to said outer casing and having a sleeve provided with longitudinal slots or air-spaces, a suitable outer covering for said sleeve, said longitudinal air-spaces communicating with the air-spaces within said outer casing.

In testimony whereof I affix my signature in presence of two witnesses.

ANDREW ALFSON.

Witnesses:
ROBERT KLOTZ,
MAX BAUM.